United States Patent [19]

Steele

[11] 3,933,746

[45] Jan. 20, 1976

[54] PHOTOPOLYMERIZABLE POLYMERS HAVING ANHYDRIDE-CONTAINING GROUPS

[75] Inventor: Fred W. Steele, Delaware, Ind.

[73] Assignee: Ball Corporation, Muncie, Ind.

[22] Filed: June 14, 1973

[21] Appl. No.: 370,258

[52] U.S. Cl......... 260/47 C; 96/115 R; 204/159.15; 260/17 R; 260/17.4 R; 260/17.4 ST; 260/17.4 SG; 260/47 UA; 260/75 R; 260/47 CZ; 260/75 UA; 260/75 N; 260/913 VA; 260/875; 428/458; 428/480; 428/482
[51] Int. Cl.² ...................................... C08F 116/06
[58] Field of Search ........ 260/47 UA, 75 UA, 47 C, 260/47 CZ, 75 R, 75 N

[56] References Cited
UNITED STATES PATENTS

| | | | |
|---|---|---|---|
| 2,956,878 | 10/1960 | Michiels et al. | 96/33 |
| 3,453,237 | 7/1969 | Borden et al. | 260/47 |
| 3,615,434 | 10/1971 | McConkey et al. | 96/28 |
| 3,615,628 | 10/1971 | Mench et al. | 96/115 |
| 3,674,727 | 7/1972 | Fekete et al. | 260/22 D |
| 3,821,167 | 6/1974 | Asano | 260/49 |

*Primary Examiner*—Lester L. Lee
*Attorney, Agent, or Firm*—Gilbert E. Alberding

[57] ABSTRACT

The polymer herein described comprises an anhydride-containing group represented by the structure:

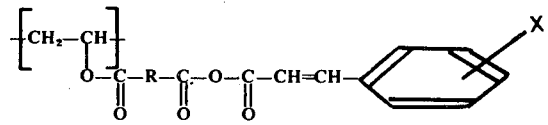

wherein R is a residue of a dibasic acid selected from the group consisting of aliphatic dicarboxylic acids and aromatic dicarboxylic acids, and X is selected from the group consisting of hydrogen, halogen, lower alkoxy, lower alkyl and nitro. The polymers are essentially useful as photopolymerizable materials and as adhesives.

4 Claims, No Drawings

PHOTOPOLYMERIZABLE POLYMERS HAVING ANHYDRIDE-CONTAINING GROUPS

BACKGROUND OF THE INVENTION

The invention relates to novel polymer compositions and, more particularly, to polymers capable of photopolymerization. A number of various polymeric compositions can be readily polymerized under the influence of light rays of short wavelength to render cross-linked polymeric structures. Such cross-linked structures have a number of important applications. In photolithographic and photomechanical processes light-sensitive polymeric compositions are coated upon a suitable supporting surface, such as metal plates, and thereafter exposed to actinic light resulting in the formulation of new carbon to carbon bonding with the net result that upon further treatment with various solvent systems there is insolublization in the exposed areas and solublization of the coated polymer in the unexposed areas. Thus, the unexposed areas of the polymer coating can be removed by means of suitable solvents to leave in relief the exposed image configuration which has undergone cross-linking on the supporting surface.

Among the conventional polymeric compositions which can undergo photopolymerization are additional polymerizable, ethylenically unsaturated polymers including alkyds, polyvinyl alcohol acetals with lateral vinylidene groups, and polyvinyl alcohol acetals and/or ester with lateral polymerizable ethylene groups. In recent years, consideration has been given to various kinds and types of lateral groups. One highly reactive functional group which seemingly has inherent light sensitivity is the cinnamoyl.

SUMMARY OF THE INVENTION

An object of this invention is to provide novel addition polymerizable, ethylenically unsaturated polymer compositions.

Another object is to provide such compositions which are capable of being converted via actinic light into tough solvent insoluble shaped articles.

A further object is to provide adhesive and adhesive-like compositions which can be readily cross-linked to form bonded or united structures.

A further object is to provide novel compositions which can be readily coated on supporting surfaces useful in making printing resist via photopolymerization of such compositions.

Still other objects will be apparent from the following description of the invention.

Briefly, the invention relates to novel polymer compositions comprising as an essential recurring unit an anhydride-containing group represented by the structure:

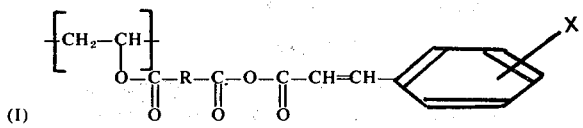

(I)

wherein R is a residue of a dibasic acid is selected from the group consisting of aliphatic dicarboxylic acids and aromatic dicarboxylic acids, and X is selected from the group consisting of hydrogen, halogen, lower alkoxy, lower alkyl and nitro.

In accordance with this invention, the novel polymers comprise at least 10 mole percent of the recurring unit (I) of said polymer. Generally and more preferably the polymer may comprise from 10 to 85 mole percent of said unit. The remaining recurring structural units are non-anhydride units, and include any polymeric units derived from polymerization of vinyl alcohols with other polymerizable materials. Illustrated of such structural units are:

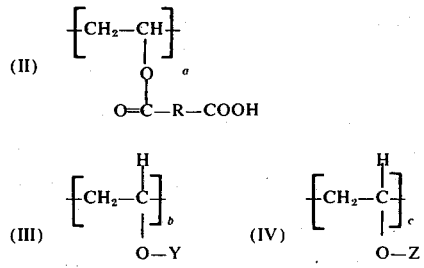

wherein R is as previously stated and Y is a member selected from the group consisting of hydrogen, lower acyl, lower alkyl and lower hydrox alkyl, and Z is a member selected from the group consisting of cinnamoyl, halocinnamoyl, lower alkoxy cinnamoyl, lower acyl cinnamoyl, lower hydroxalkyl cinnamoyl, and nitro cinnamoyl. The term "lower" denotes eight or less carbon atoms.

Various compositions are therefore evident from the aforementioned compositional limitations to those skilled in the art. Thus, for example, the polymers herein may comprise from about 10 mole percent to about 50 mole percent of the recurring unit having the structure (I) and from about 50 mole percent to about 90 mole percent of the recurring unit having the structure (II). It will also be evident to those skilled in the art that minor amounts of other structural units may be incorporated into the polymers described herein. Thus, the polymer compositions may have in addition to the two aforementioned recurring units (I) and (II) the structural units (III) and (IV) incorporated therein. As an example such polymers may contain up to about 10 mole percent of the recurring unit having the structure (III) and up to about 10 mole percent of a recurring unit having the structure (IV).

The polymeric backbone of the polymers described herein includes any polymer having the structure:

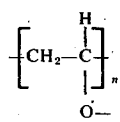

It will be understood that this backbone refers broadly to the polymers having a carbon main chain. Generally these polymers contain a plurality of polymerized or combined vinyl units containing oxygen intralinear to the carbon chain. These are generally designated as polyols or polyhydric alcohols. Representative of such polyols are cellulose, starches, dextran and poly (vinyl alcohol). As is well known polymers of vinyl alcohol are prepared by polymerizing a vinyl ester, e.g., vinyl acetate, vinyl chloracetate, vinyl propionate etc., followed by alcoholysis of the poly (vinyl ester).

Such polymers containing a plurality of hydroxyl units useful in this invention are those having at least an average molecular weight greater than 1000 but less than 200,000. The preferred average molecular weight is one between 2,500 and 100,000.

The divalent R group incorporated in the polymers of this invention to form a first lateral side chain function include the symmetrical and, in particular, the cyclic anhydrides formed from aliphatic or aromatic dicarboxylic acids which can be cyclize with formation of four-to-six membered rings. Representative of such cyclic anhydrides are succinic anhydride, glutaric anhydride, phthalic anhydride, citraconic anhydride, d-camphoric anhydride, pyrotataric anhydride, naphthalic anhydride, pyromellitic anhydride, trimellitic anhydride and Δ4-tetrahydrophthalic anhydride.

The reaction of the cyclic anhydrides with the polyols under the conditions herein produce the monoester and free carboxlic acid groups which is thereafter reacted with the cinnamoyl-containing monomers to produce the anhydride-containing group (I). This group (I) in the absence of heat and light is seemingly stable due to, it is speculated, the conjugated arrangement of the whole lateral chain.

The cinnamoyl-containing monomers which can be readily incorporated or a terminal function of a lateral side chain in the polymers of this invention include: cinnamic acid, o-methylcinnamic acid, o-methoxycinnamic acid, o-chlorocinnamic acid, n-nitro-cinnamic and o-tolylcinnamic acid chlorides.

It has been found that the cinnamoylation is best accomplished at low temperatures, viz., 0°C., 5°C. Conventional techniques for forming, mixing and solution polymerization can be applied, the partial technique varying with the differences in the properties of the respective components.

A number of addition polymerization initiators may be chosen to effect the polymerization to actinic light, generally of wavelengths in the range of 1800 to 7000 A., and should be present in an amount of 0.05 to about 5.0% by weight, based on the ethylenically unsaturated addition polymerizable monomer present in the entire composition. The initiators useful herein include 2 - benzoylmethylene - 1 - methyl -β- naphthothiazoline; Michler's ketone; 1,2-benzanthraquinone and the like.

In order to prevent polymerization prior to use, there may be incorporated in the polymer compositions small additions, for example, 1 to 500 parts per million of the whole of a stabilizer which prevent addition polymerization, e.g., 2,6-di-terbutyl-p-cresol hydroquinone and tertiary-butyl catecol. Such polymerization inhibitors improve the storage stability of these compositions by preventing premature polymerization induced by accidental exposure to adventitious light.

The photopolymerizable copolymers are suitable for other purposes in addition to the printing uses described above, namely, for producing resist images for printing plates. Other suitable uses include the compositions herein described as adhesive compositions for bonding substrates, rapid cure coatings for plastic articles, additives for protective coatings, laminating resins, and polymeric materials useful in the preparation of printed circuits. In short, the compositions herein are useful for many purposes in which crosslinkable polymers are employed.

The following examples are illustrative and are included for a further understanding of the invention.

EXAMPLE 1

In a glass vessel 1 mole of poly(vinyl alcohol) having an average molecular weight of about 10,000 was slowly stirred for about 12 hours in 750 mls., anhydrous pyridine at 80°C. One mole of Δ4-tetrahydrophthalic acid anhydride was dissolved in 850 mls., anhydrous pyridine and added to the vessel containing the poly(vinyl alcohol). The reaction mixture was heated at about 80°C., under constant stirring for about 24 hours. Thereafter, the reaction mixture was cooled to 0°c., and about 50 ml., cinnamoyl chloride was added dropwise. After complete solution the reaction mixture was stirred at room temperature for 8 hours, filtered through cotton and the polymer thus-formed precipitated into approximately 10 liters of cold distilled water. The collected polymer was thoroughly washed several times with distilled water and vacuum dried at room temperature. The polymer was thereafter dissolved in one percent aqueous ammonium hydroxide solution to obtain a weight-volume concentration of five percent. Thereafter, about 0.5 gms., 2-benzoylmethylene-1-β-naphthothiazoline was added and thoroughly mixed therein. The polymer solution was thereafter treated in accordance with Examples 11 and 12.

EXAMPLE 2

In a glass vessel one mole of poly(vinyl alcohol) having an average molecular weight of about 10,000 was slowly stirred for about 12 hours in 750 mls., anhydrous pyridine at 80°C. One mole of Δ4-tetrahydrophthalic acid anhydride was dissolved in 850 ml., anhydrous pyridine and added to the vessel containing the poly(vinyl alcohol). The reaction mixture was heated at about 80° C., under constant stirring for about 24 hours. Thereafter, the reaction mixture was cooled to 0°C., and about 15 ml., o-methoxycinnamic chloride was added dropwise. After complete solution the reaction mixture was stirred at room temperature for 8 hours, filtered through cotton and the polymer thus-formed precipitated into approximately 10 liters of cold distilled water. The collected polymer was thoroughly washed several times with distilled water and vacuum dried at room temperature. The polymer was thereafter dissolved in one percent aqueous ammonium hydroxide solution to obtain a weight-volume concentration of 5 percent. Thereafter about 0.3 gms., 1,2-benzanthraquinone was added and thoroughly mixed therein. The polymer solution was thereafter treated in accordance with Examples 11 and 12.

EXAMPLE 3

In a glass vessel one mole of poly(vinyl alcohol) having an average molecular weight of about 10,000 was slowly stirred for about 12 hours in 750 mls., anhydrous pyridine at 80° C. One mole of Δ4-tetrahydrophthalic acid anhydride was dissolved in 850 ml., anhydrous pyridine and added to the vessel containing the poly(vinyl alcohol). The reaction mixture was heated at about 80°C., under constant stirring for about 24 hours. Thereafter the reaction mixture was cooled to 0°C., and about 100 ml., n-nitrocinnamic chloride was added dropwise. After complete solution the reaction mixture was stirred at room temperature for 8 hours, filtered through cotton and the polymer thus-formed precipitated into approximately 10 liters of cold distilled water. The collected polymer was thoroughly washed several times with distilled water and vacuum dried at room temperature. The polymer was thereafter dissolved in one percent aqueous ammonium hydroxide solution to obtain a weight-volume concentration of 5 percent. Thereafter, about 0.6 gms., tetramethyldiaminobenzophenone was added and thoroughly mixed therein. The polymer solution was thereafter treated in accordance with Examples 11 and 12.

EXAMPLE 4

A solution of one mole of poly(vinyl alcohol) having an average molecular weight of 96,000 was slowly stirred for about 12 hours in 750 ml., anhydrous pyridine at 80° C. Into about 800 ml., anhydrous pyridine was added 0.8 mole of $\Delta 4$-tetrahydrophthalic acid anhydride. This mixture was added to the vessel containing the poly(vinyl alcohol). The reaction mixture was heated at 80°C., and stirred for about 24 hours. Analysis showed approximately 80% of the hydroxyl groups of poly(vinyl alcohol) were reacted with the acid anhydride, the remaining being free hydroxyl groups. The reaction mixture was thereafter cooled to 0° C., and about 50 mls., cinnamoyl chloride were added dropwise. After complete solution the reaction mixture was stirred at room temperature for about 8 hours, filtered through cotton and the polymer thus-formed, collected into approximately 10 liters of cold distilled water. The collected polymer thus-formed, was thoroughly washed several times with distilled water and vacuum dried at room temperature. The polymer was dissolved in Cellosolve (Union Carbide Corporation) to obtain a weight-volume concentration of 5%. Thereafter, about 0.5 gm., 1, 2-benzanthraquinone was added to the polymer solution. The polymer solution was thereafter treated in accordance with Examples 11 and 12.

EXAMPLE 5

In a one liter glass vessel, one mole of poly(vinyl alcohol) was stirred for about 10 hrs., in 750 mls., anhydrous pyridine at 80° C. One mole of succinic anhydride was dissolved in 825 mls., anhydrous pyridine and added to the vessel containing the poly(vinyl alcohol). The reaction mixture was heated at about 80° C., under constant stirring for about 24 hours. Thereafter, the reaction mixture was cooled to 0° C., and about 50 ml., cinnamoyl chloride was added dropwise. After complete solution the reaction mixture was stirred at room temperature for 8 hours, filtered through cotton and the polymer thus-formed precipitated into approximately 10 liters of cold distilled water. The collected polymer was thoroughly washed several times with distilled water and vacuum dried at room temperature. The polymer was thereafter dissolved in one percent aqueous ammonium hydroxide solution to obtain a weight-volume concentration of five percent. Thereafter, about 0.5 gms., 2-benzoylmethylene-1-$\beta$- naphthothiazoline was added and thoroughly mixed therein. The polymer solution was thereafter treated in accordance with Examples 11 and 12.

EXAMPLE 6

In a glass vessel one mole of poly(vinyl alcohol) was slowly stirred for about 12 hrs. in 750 mls., anhydrous pyridine at 80° C. One mole of phthalic anhydride was dissolved in 825 mls., anhydrous pyridine and added to the vessel containing the poly(vinyl alcohol). The reaction mixture was heated at about 80° C., under constant stirring for about 24 hours. Thereafter, the reaction mixture was cooled to 0° C., and about 50 ml., cinnamoyl chloride was added dropwise. After complete solution the reaction mixture was stirred at room temperature for 8 hours, filtered through cotton and the polymer thus-formed precipitated into approximately 10 liters of cold distilled water. The collected polymer was thoroughly washed several times with distilled water and vacuum dried at room temperature. The polymer was thereafter dissolved in 1 percent aqueous ammonium hydroxide solution to obtain a weight-volume concentration of 5 percent. Thereafter, about 0.5 gms., 4,4-bis(dimethylamino) benzophenone was added and thoroughly mixed therein. The polymer solution was thereafter treated in accordance with Examples 11 and 12.

EXAMPLE 7

In a 1 liter glass vessel one mole of hydroxyl ethyl cellulose having an average molecular weight of about 150,000 was slowly stirred for about 10 hours in 675 mls., anhydrous pyridine at about 70°C. One mole of $\Delta 4$-tetrahydrophtalic acid anhydride was dissolved in 850 ml., anhydrous pyridine and added to the vessel containing the cellulose. The reaction mixture was heated at about 80°C., under constant stirring for about 24 hours. Thereafter, the reaction mixture was cooled to 0°C., and about 50 ml., cinnamoyl chloride was added dropwise. After complete solution the reaction mixture was stirred at room temperature for 8 hours filtered through cotton and the polymer thus-formed precipitated into approximately 10 liters of cold distilled water. The collected polymers was thoroughly washed several times with distilled water and vacuum dried at room temperature. The polymer was thereafter dissolved in one percent aqueous ammonium hydroxide solution to obtain a weight-volume concentration of five percent. Thereafter, about 0.5 gms., 2-benxoylmethylene-1-$\beta$-naphthothiazoline was added and thoroughly mixed therein. The polymer solution was thereafter treated in accordance with Examples 11 and 12.

EXAMPLE 8

In a glass vessel about 1 mole of dextran having an average molecular weight of about 30,000 was slowly dissolved in 500 mls., anhydrous pyridine at 80°C. One mole of $\Delta 4$-tetrahydrophthalic acid anhydride was dissolved in 850 ml., anhydrous pyridine and added to the vessel containing dextran. The reaction mixture was heated at about 80°C., under constant stirring for about 24 hours. Thereafter, the reaction mixture was cooled to 0°C., and about 50 ml., cinnamoyl chloride was added dropwise. After complete solution the reaction mixture was stirred at room temperature for 8 hours, filtered through cotton and the polymer thus-formed precipitated into approximately 10 liters of cold distilled water. The collected polymers was thoroughly washed several times with distilled water and vacuum dried at room temperature. The polymer was thereafter dissolved in one percent aqueous ammonium hydroxide solution to obtain a weight-volume concentration of five percent. Thereafter, about 0.5 gms., 2-benzoylmethylene-1-β-naphthothiazoline was added and thoroughly mixed therein. The polymer solution was thereafter treated in accordance with Examples 11 and 12.

EXAMPLE 9

In a 1 liter glass vessel 1 mole of arrow-root starch having an average molecular weight of 175,000 was slowly added and stirred for about 10 hrs. in 800 mls., anhydrous pyridine at 75°C. One mole of Δ4-tetrahydrophthalic acid anhydride was dissolved in 850 ml., anhydrous pyridine and added to the vessel containing the starch. The reaction mixture was heated at about 80°C., under constant stirring for about 24 hours. Thereafter, the reaction mixture was cooled to 0°C., and about 50 ml., cinnamoyl chloride was added dropwise. After complete solution the reaction mixture was stirred at room temperature for 8 hours, filtered through cotton and the polymer thus-formed precipitated into approximately 10 liters of cold distilled water. The collected polymers was thoroughly washed several times with distilled water and vacuum dried at room temperature. The polymer was thereafter dissolved in one percent aqueous ammonium hydroxide solution to obtain a weight-volume concentration of five percent. Thereafter, about 0.5 gms., 2-benzoylmethylene-1-β-naphthothiazoline was added and thoroughly mixed therein. The polymer solution thereafter treated in accordance with Examples 11 and 12.

EXAMPLE 10

In a glass vessel 22 gms., poly(vinyl alcohol) was allowed to swell in about 150 mls., anhydrous pyridine for 2 hrs., at 90° C., with constant stirring. At the same temperature 101 gms., Δ4-tetrahydrophthalic anhydride was dissolved in 350 mls., anhydrous pyridine and added to the glass vessel containing the poly(vinyl alcohol). The mixture was heated and stirred for about 40 hours. The product was precipitated with about 6% aqueous acetic acid and washed twice with distilled water. The product was thereafter vacuum dried at 50° C., for 8 hours. The yield of product was approximately 70 gms. About 35 gms., of the polymer product was dissolved in 350 mls., anhydrous pyridine with constant stirring at room temperature. After dissolution about 17 gms., cinnamoyl chloride was added at 0° C., and stirred for about 20 hours. The resulting polymer was precipitated, washed and vacuum dried. The yield of polymer was about 30 gms. The polymer was thereafter dissolved in one percent aqueous ammonium hydroxide solution to obtain a weight-volume concentration of five percent. Thereafter about 0.5 gms., 2-benzoylmethylene-1-β-naphtholthiazoline was added and thoroughly mixed therein. The polymer solution was thereafter treated in accordance with Examples 11 and 12.

EXAMPLE 11

The various polymer solutions obtained from Example 1 through 10 were separately coated onto four different metal plates having a fine grain and one plastic substrate: viz., (1) aluminum, (2) zinc, (3) magnesium, (4) copper and (5) a polyester film (Mylar, Trademark of E. I. duPont de Nemours and Co.). The coatings of the various solutions were allowed to thoroughly dry and then they were exposed to an ultraviolet light sourse under a graduated density step tablet to insolubilize the polymer coating in the areas of exposure. Thereafter, the unexposed polymer of the coating was removed from each plate by treatment with a dilute 0.5% ammonium hydroxide. All the substrates thustreated contained an excellent visible image of the original step tablet.

EXAMPLE 12

The various polymer solutions prepared in accordance with Example 1 through 10 were applied in the form of thin coatings to (1) a metallic substrate (2) a ceramic substrate (3) a wooden substrate and to a (4) paper substrate. The coatings were covered with an identical substrate material and pressed into intimate contact whereby any excess solution was removed. The substrates were maintained in contact under gentle pressure and placed in an oven at about 80° C., for 5 hours. There was found excellent bonding between the two surfaces showing that the compositions herein give excellent adhesive characteristics.

Although the invention has been described in considerable detail with reference to certain preferred embodiments thereof, it will be understood that variations and modifications can be effected without departing from the spirit and scope of the invention as described herein before and in the appended claims.

What is claimed is:

1. A polymer comprising as a recurring unit an anhydride-containing group represented by the structure:

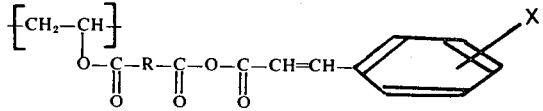

wherein —CO—R—CO— is a residue of a dibasic acid selected from the group consisting of aliphatic dicarboxylic acids and aromatic dicarboxylic acids, and X is selected from the group consisting of hydrogen, halogen, lower alkoxy, lower alkyl and nitro, the remaining recurring unit being non-anhydride unit selected from the group consisting of:

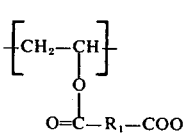 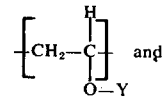 and

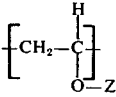

wherein —CO—R$_1$—COOH is the residue of a dibasic acid selected from the group consisting of aliphatic dicarboxylic acids and aromatic dicarboxylic acids, Y is a member selected from the group consisting of hydrogen, lower acyl, lower alkyl and lower hydroxalkyl, and Z is a member selected from the group consisting of cinnamoyl, halocinnamoyl, lower alkoxy cinnamoyl, lower acyl cinnamoyl, lower hydroxalkyl cinnamoyl, and nitro cinnamoyl.

2. A polymer as recited in accordance with claim 1 wherein the anhydride-containing group comprises at least about 10 mole percent of the recurring units of the polymer.

3. A polymer as recited in accordance with claim 1 wherein the —CO—R—CO— is a residue selected from the group consisting of tetrahydrophthalic, succinic, maleic, phthalic, glutaric, malonic, 1,2-dimethylsuccinic, citraconic, naphthalic, pyrotartaric, camphoric, trimellitic, pyromellitic and hexahydrophthalic acids.

4. A polymer containing as a major recurring unit an anhydride-containing unit represented by the general structure:

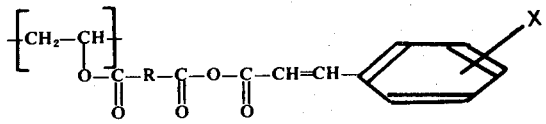

wherein —CO—R—CO— is a residue of a dibasic acid selected from the group consisting of succinic, glutaric, phthalic, citraconic, camphoric, pyrotataric, napthalic, pyromellitic, trimellitic, malonic, 1,2-dimethylsuccinic, hexahydrophthalic, maleic, pyrotartaric and Δ4-tetrahydrophthalic, and X is selected from the group consisting of hydrogen, halogen, lower alkoxy, lower alkyl and nitro and as a minor recurring unit a non-anhydride unit derived from vinyl polymerization, said minor recurring unit being a member selected from the group consisting of:

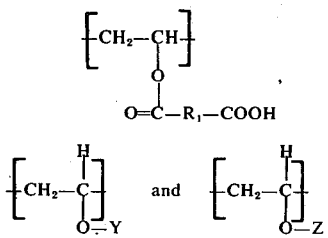

wherein —CO—$R_1$—COOH is the residue of a dibasic acid selected from the group consisting of aliphatic dicarboxylic acids and aromatic dicarboxylic acids, Y is a member selected from the group consisting of hydrogen, lower acyl, lower alkyl and lower hydroxalkyl, and Z is a member selected from the group consisting of cinnamoyl, halocinnamoyl, lower alkoxy cinnamoyl, lower acyl cinnamoyl, lower hydroxalkyl cinnamoyl, and nitro cinnamoyl.

* * * * *